May 27, 1930.  W. S. BELLOWS  1,760,036
TABLE
Filed June 12, 1924  5 Sheets-Sheet 1
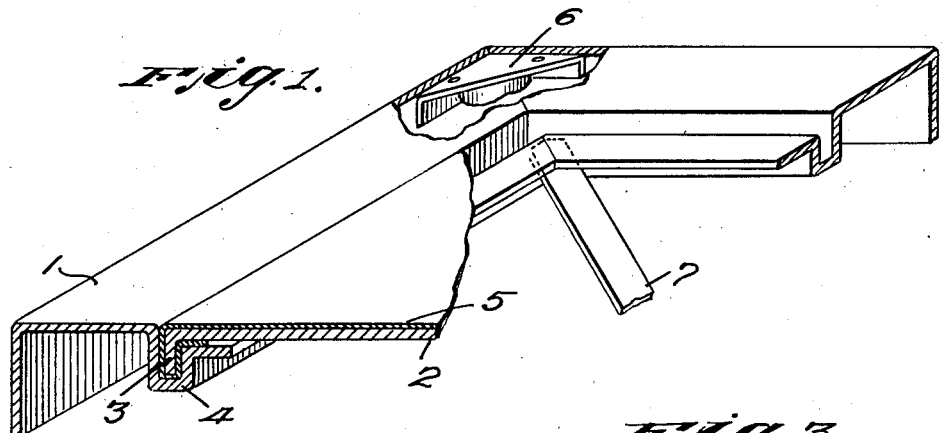
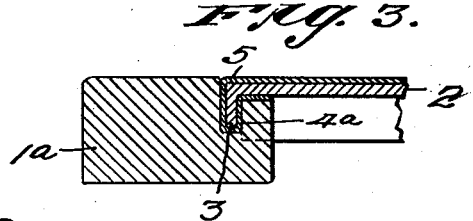
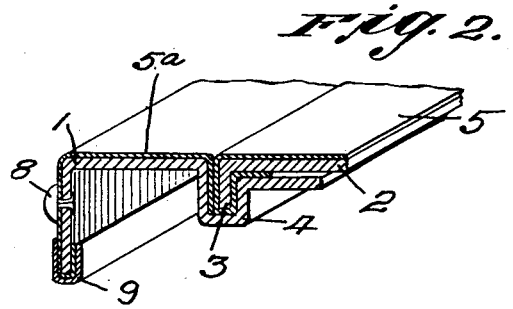
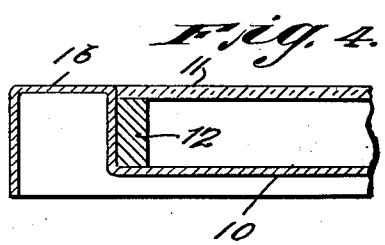
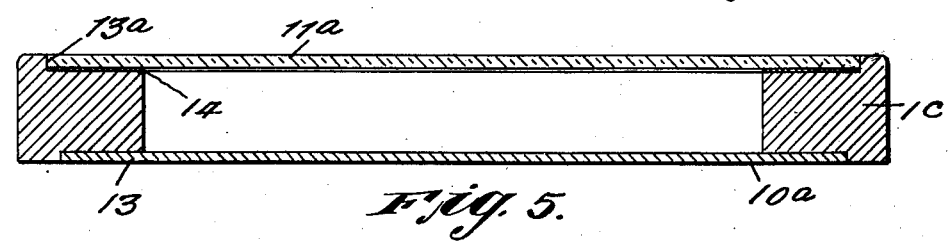
INVENTOR
WARREN S. BELLOWS
BY William P. Hammond
ATTORNEY

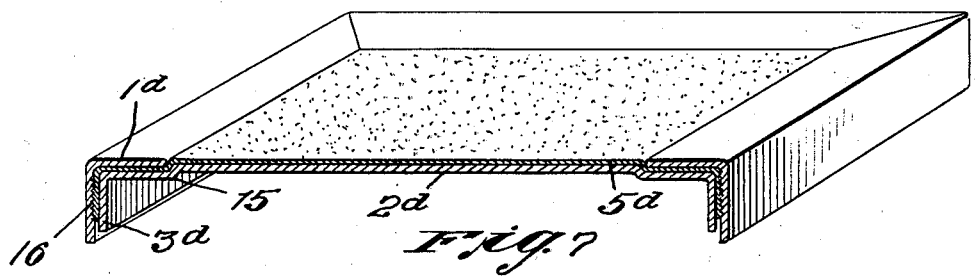
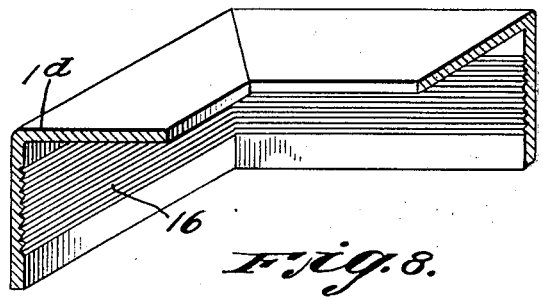
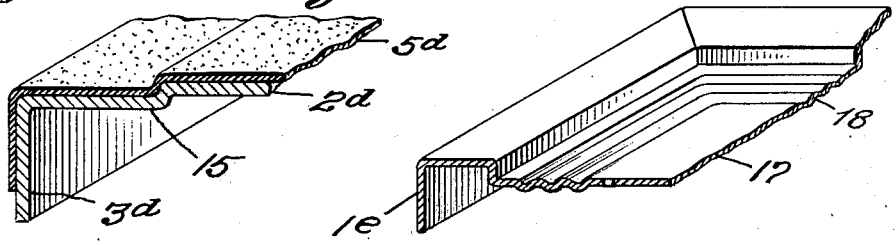
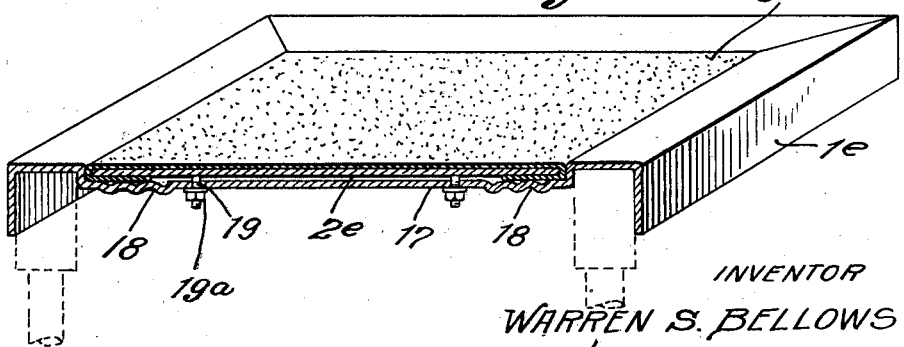

May 27, 1930.　　　W. S. BELLOWS　　　1,760,036
TABLE
Filed June 12, 1924　　　5 Sheets-Sheet 3
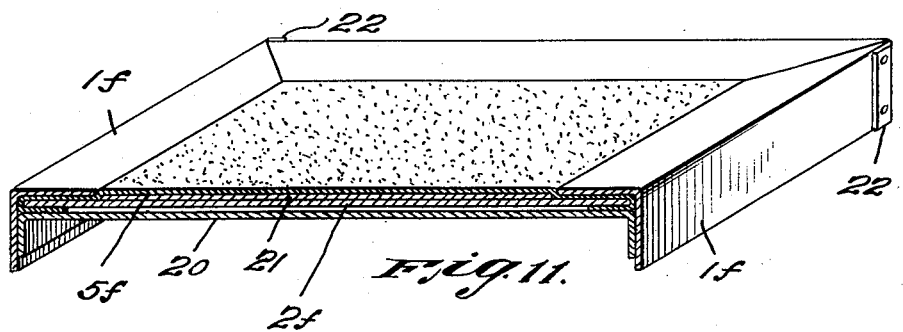
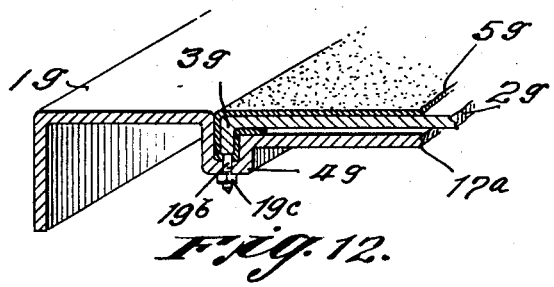 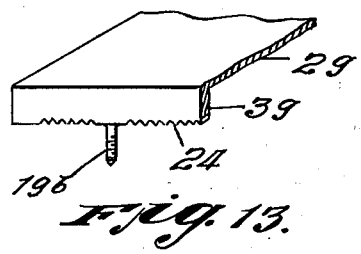
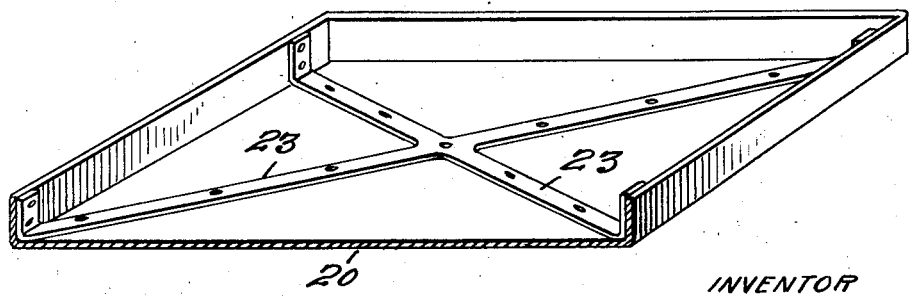
INVENTOR
WARREN S. BELLOWS
BY
ATTORNEY

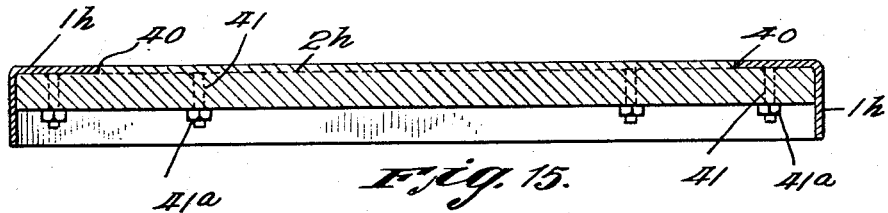
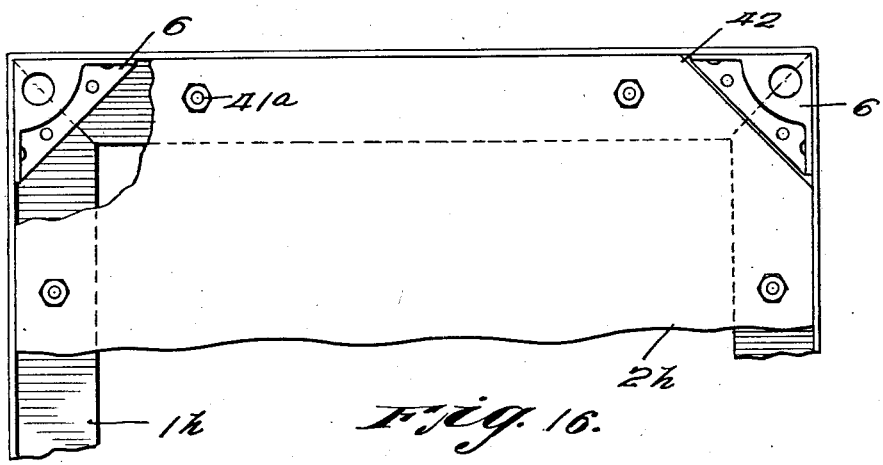
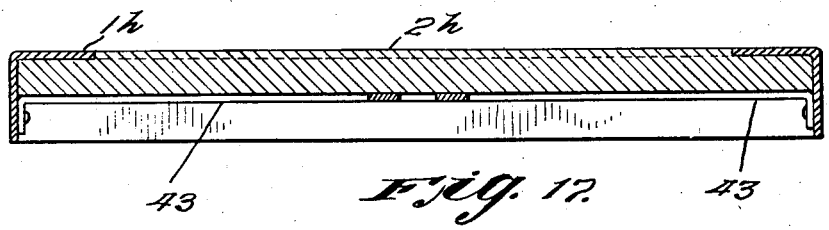

May 27, 1930. W. S. BELLOWS 1,760,036
TABLE
Filed June 12, 1924 5 Sheets-Sheet 5
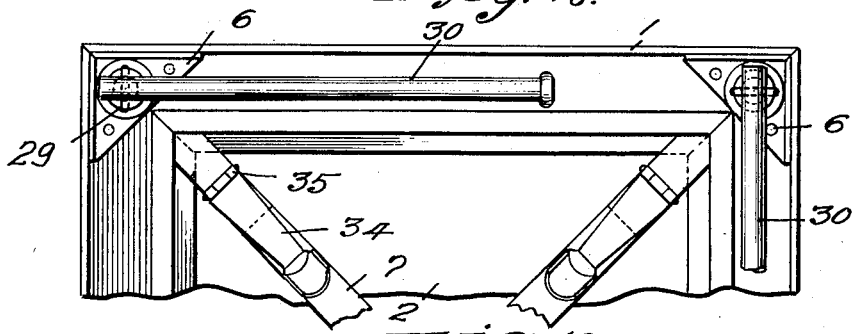
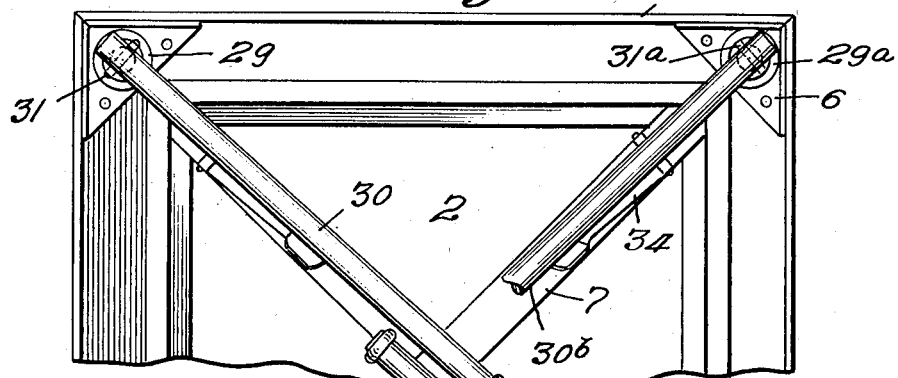
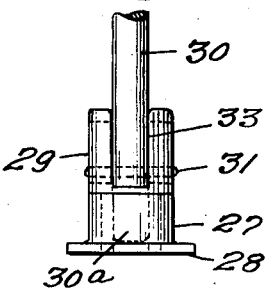
INVENTOR
WARREN S. BELLOWS
BY
ATTORNEY Patented May 27, 1930

1,760,036

UNITED STATES PATENT OFFICE

WARREN S. BELLOWS, OF WORCESTER, MASSACHUSETTS

TABLE

Application filed June 12, 1924. Serial No. 719,514.

This invention relates to an improvement in the construction of tables and particularly to the construction of table tops.

It is an object of the invention to provide a table top for card playing, display purpose or the like comprising a rim and a separate center portion, with means for detachably connecting the rim and centre portion to permit easy removal of the center portion, for the purpose of recovering the same, changing the display or for other reasons.

Another object of the invention is to provide a table of the character described which can be assembled or built in sections to form a table of rugged construction, and neat appearance at a low manufacturing cost.

Another object of the invention is to provide a collapsible table of the type described which when not in use may be folded or collapsed into a small space for shipping or storage.

Another object of the invention is to provide a table of the type described which may be formed of metal, fibre board or other light easily shaped material and to provide an easily applied means for assembling and reinforcing the same to form the complete table.

Another object of the invention is to provide a table of the type described, comprising a rim and a separate centre portion the parts of which may be carried in stock and assembled to form either a display or card table as desired.

Various other objects and advantages of the invention will appear as the description thereof proceeds.

Referring now to the drawings which illustrate several possible forms of embodiment of the invention.

Figure 1 is a perspective view of one corner of the table with parts broken away to more clearly show the construction thereof.

Figure 2 is a detail perspective view of a modified form of the invention.

Figure 3 is a sectional view of a further modification.

Figures 4 and 5 are sectional views of a table suitable for display purposes.

Figure 6 is a part sectional perspective view of a further modification.

Figures 7 and 8 are detail views of parts of the table of Figure 6 in disassembled relation.

Figure 9 is a perspective view of another form of table top.

Figure 10 is a detail perspective view of a portion of the table of Figure 9.

Figure 11 is a perspective view of another form of table top.

Figures 12 and 13 are detail views of one way of securing the removable top portion and fabric cover therefor in place.

Figure 14 is a bottom view showing the reinforcing means for the top.

Figure 15 is a sectional view of another modification.

Figure 16 is a bottom plan view of another modification partially broken away to show details of the construction.

Figure 17 is a sectional view of a reinforced top.

Figures 18 and 19 are bottom plan views of the table of Figure 1 equipped with folding legs.

Figure 20 is a detail view of the folding leg and socket therefor.

Figure 21 is a side view of the leg and socket.

In the embodiments illustrated in Figures 1 and 2 the table top comprises a rim portion 1 and a detachable centre portion 2, provided with a turned down edge 3 adapted to rest in the groove 4 provided in the rim portion. The groove 4 is preferably wide enough to receive the edge 3 and the layers of fabric leather or other material 5 is used to cover the top 2 and to hold the same with a tight frictional grip to prevent loosening of the cover and to prevent accidental displacement of the centre portion. It is obvious that with this construction the centre portion 2 may be very easily and quickly removed from the rim portion 1 to permit changing of the fabric cover for the center 2 or to replace the center portion shown with a center portion having advertising matter thereon suitable for display purposes or similar to the top shown in Figure 5 which will be described later.

The rim portion 1 may be formed in four parts by pressing, stamping, rolling or the like and secured together at the corners by suitable braces 6, or the entire rim may be made in one piece and bent into rectangular form by cutting away triangular portions of the top part thereof adjacent the corners, when in one piece the free ends may be secured together by angle braces welded or riveted thereto, or the entire rim may be made as a one piece stamping. A pair of braces 7 extend diagonally across the rim from corner to corner thereof.

In Figure 2 the rim portion 1 is also provided with a cover $5^a$ of leather, fabric or the like which extends from the groove 4 to the lower edge thereof. For ornamentation and to protect the cover $5^a$ from tearing and wear when the table is stood on edge a plurality of large headed tacks or rivets 8 may be provided along the side of the rim. A trough shaped strip of metal or the like 9 is provided to hold the cover $5^a$ on the lower edge of the rim 1.

Figure 3 shows a modified form of rim $1^a$ which may be made of wood, fibre or any suitable light weight material. A groove $4^a$ in the rim $1^a$ receives the edge 3 of the removable center portion 2.

Figures 4 and 5 illustrates a table top provided with a center compartment 10 and a transparent cover 11 therefor, which may be used for the display of goods and also for serving beverages or foods thereon or for other purposes. In the embodiment of Figure 4 the rim portion $1^b$ may be formed of metal or the like provided with the compartment 10. A supporting ledge 12 is adapted to support the cover glass 11 flush with the top of the rim $1^b$. The rim $1^b$ may be provided with a suitable fabric covering as in Figure 2, if desired, and the center compartment may be made detachable as in Figures 1 to 3 to permit the table to be quickly converted from a display to a card table or vice versa by merely changing the center portions thereon.

In Figure 5 the rim portion $1^c$ is rabbeted at 13 and $13^a$ to receive a bottom center piece $10^a$ and the cover glass $11^a$ flush with the rim. Between the edges of the cover glass $11^a$ and the rim $1^c$ suitable paper or cardboard borders 14 may be inserted, carrying advertising material.

Figures 6, 7, and 8 show a table top comprising a separate rim portion $1^d$ of angle iron construction or the like which is detachably supported on a centre portion $2^d$. The centre portion $2^d$ in this embodiment has a depression 15 around the edges thereof and has a downwardly extending flange $3^d$ around the edges. A suitable covering material $5^d$ is provided for the center portion $2^d$ and extends down the edges $3^d$ thereof and the side portion of the rim $1^d$ is provided with ridges or corrugations 16 on the inner wall, into which the covering $5^d$ is forced when the rim $1^d$ is pushed down on the center portion $2^d$ to hold the covering in place. The depression 15 is of sufficient depth to bring the rim of the table flush with the covered top of the centre portion thereof.

In the embodiment shown in Figures 9 and 10 the rim portion $1^e$ is provided with an integral connecting portion 17 which may be corrugated as at 18 to provide additional strength and to assist in holding the covering material $5^e$ on the center portion $2^e$. By thus providing an integral connecting portion 17 and corrugating the same around the edges it is possible to use thinner or lighter material for the table top without materially decreasing the strength or rigidity of the table the centre portion $2^e$ may be provided with bolts 19 which pass through holes in the portion 17 and are secured therein by nuts $19^a$ on the under side of the top.

Figure 11 illustrates a still further embodiment of the invention in which the top 20 of the table carried by a detachable rim $1^f$ and a separate center portion $2^f$ provided with a suitable covering $5^f$. A layer 21 of suitable cushioning or sound deadening material is carried on the centre portion $2^f$ to bring the top of the centre portion flush with the rim $1^f$. The rim $1^f$ in this embodiment is shown as being formed in four parts with an integral securing portion 22 at one end of each part, adapted to be bent over and secured to the adjoining part as illustrated. If desired the top 20 or the centre portions 2, $2^d$ etc. may be reinforced by suitable diagonal braces 23 as illustrated in Figure 14. The braces 23 may be pressed into the top 20 or 2 when the same is formed, or may be inserted later and welded or riveted in place.

By providing the braces 23 a lighter gage metal may be used for the top without danger of warping or bending out of shape.

Figures 12 and 13 show a modification of Figures 1 and 2 in which the rim portion $1^g$ may be provided with an integral connecting portion $17^a$. In this embodiment the edge $3^g$ of the detachable centre portion $2^g$ is ridged or corrugated at 24 to grip the cover 5 and is provided with bolts $19^b$ and the groove $4^g$ is provided with holes for the bolts $19^b$. The centre portion $2^g$ is secured to the table by the nuts $19^c$ on the bolts $19^b$.

Figures 15 and 16 show a table of the type described in which a metallic rim 1ᵇ supports a removable centre portion 2ʰ of wood, fibre board or other suitable material. The centre portion is rabbeted at 40 to receive the rim 1ʰ with the top thereof flush with the centre portion, and the rim portion is provided with bolts 41 which pass through the centre portion and receive the nuts 41ᵃ to hold the centre portion in place. The rim 1ʰ is put together by braces 6 as has been described and the corners of the portion 2ʰ are cut away at 42 to accommodate the braces.

Figure 17 embodies a table similar to the one shown in Figures 15 and 16 in which the centre portion 2ʰ is held in the rim 1ʰ by means of braces 43 which extend from one side of the rim to the other.

While the table tops shown in Figures 1 to 17 may be provided with fixed legs, as illustrated in Figure 9, for general utility, it is preferred to provide the tops with a form of folding or collapsible legs invented by me, which are as rigid as the ordinary fixed leg. Figures 18 and 21 illustrate one form of such leg as applied to the table top shown in Figures 1 and 2 but it is to be understood that this leg may be applied to the tops shown in the other figures of the drawing if desired.

As shown more clearly in Figure 20 the corner brace 6 for the parts of the rim 1 is provided with a hole 25 in the section adjacent the top portion of the rim and with a ledge 26 around this hole, a thimble 27 is inserted in this hole with the collar 28 thereof resting in the ledge 26 and the brace 6 is secured to the corner of the table, during which operation the thimble 27 may be spot welded in place. A bifurcated socket 29 is then attached to the leg 30, which may be of rod or tubular form by inserting it in the socket and securing same therein by a pin 31 inserted through the side walls of the legs and through the slot 32 in the socket and the leg and socket is secured to the table by screwing the socket into the thimble 27 and securing it there by means of a lock nut or any other suitable means. A slot 33 is provided in the socket portion to permit the leg 30 to be folded about the pin 31 as a pivot and by means to the slot 32 the end of the leg may be pushed into or pulled out of the socket 29 for setting up or taking down the table. A brace 34 is pivoted at 35 on the diagonal 7 so as to rest upon the diagonal when not in use as illustrated in Figures 18 and 19. The end of the brace 34 is bent at 36 to conform to the shape of the leg 30 and the leg is provided with a socket 37, secured by a pin 38, which slips down around the end 36 of the brace to hold the brace in place when the table is in use.

To fold the legs from the position illustrated in Figure 20 the leg 30 is lifted upward to remove the end 30ᵃ from the socket 29 and this removes the socket 37 from the end 36 of the brace, whereupon the brace 34 may be turned about its pivot 35 and the leg 30 folded in the slot 33 to a position parallel with the table top. To set the table up the legs are lifted into alignment with the hole in the socket 29, the brace 34 is placed against the leg and the end of the leg pushed into the socket 29 while the socket 37 on the leg engages the end of the brace. Since the leg extends into the socket 29 for approximately the length of the slot 32 and the brace 34 is rigidly held in place this provides a very rigid support for the table and at the same time permits rapid taking down and setting up of the table.

As illustrated in Figures 18 and 19 the legs may be folded along the sides of the rim 1 or along the diagonals 7 depending upon the length thereof and if folded along the diagonals the pins 31 of the opposite sockets are preferably turned so as to be slightly out of parallel to permit the ends of the legs to lie side by side in a plane parallel with the table top.

To permit all the legs to be folded into planes parallel with the table top the sockets such as 29ᵃ on diagonally opposite corners may if necessary have extra long slots 32 to permit the pins 31ᵃ to be spaced from the top of the table a distance greater by the thickness of one leg than the distance the pins 31 are spaced from the table when the legs are in folded position so that the ends of the legs 30ᵇ which fold over the ends of the legs 30 will lie parallel to the table top.

While I have illustrated and described several embodiments of my invention it is to be understood that various modifications may be made therein without departing from the spirit of the invention or the scope of the appended claims.

I claim:

1. In a table of the type described, the combination of separate rim and center portions, legs supporting the rim, a cover for said center portion and unitary means on the rim portion for detachably retaining the cover on said center portion and for detachably retaining the center portion in the rim portion.

2. In a table of the type described, the combination of separate rim and center portions, legs supporting the rim, a groove in the rim, a turned down edge on the center portion, a cover for said center portion which fits over said edge, the groove adapted to receive and frictionally hold said turned down edge with the cover thereon to retain the cover on the center portion and the center portion on the rim.

3. In a table of the type described, a rim portion, legs supporting the rim portion, a detachable center portion, and a cover therefor, means on the center portion projecting thru said rim portion, and means cooperating therewith for detachably securing the rim portion and the center portion together, said means securing said cover to said center portion.

4. In a table of the type described, a rim portion, legs supporting the rim portion and a detachable center portion, means on the center portion projecting thru said rim portion, means cooperating therewith for detachably securing the rim portion and the center portion together, a cover on said center portion and corrugated means for gripping the cover between the center and the rim portion.

5. In a table of the type described, the combination of separate rim and center portions, legs supporting the rim, a vertical groove in the rim portion and a turned down vertical edge on the center portion adapted to fit into said groove, the groove gripping the turned down edge with a firm frictional grip to hold the center portion in the rim, and a flexible cover adapted to be stretched over said center portion and flexibly gripped in position in said groove.

6. In a table of the type described, a rim, legs supporting the rim, and a detachable center portion, means extending beneath the center portion connecting portions of said rim, bolts on said center portion extending thru said extending means, nuts on said bolts for detachably securing the center portion and the rim together, a fabric cover on said center portion and a plurality of corrugations in said extending means for strengthening the rim and holding said cover in place.

7. In a table of the type described, the combination of a separate rim portion and a center portion, legs supporting the rim portion, a groove in the rim portion, a turned down edge on the center portion, a cover for said rim portion which extends into said groove and to the edge of the rim portion, the groove adapted to receive said turned down edge with the cover thereon and to hold the same with a firm frictional engagement to retain the cover on the center portion, the center portion on the rim portion and one edge of the rim portion cover in place, and means to secure the other edge of the rim portion cover in place.

8. In a table top of the type described, detachable rim and center portions, legs supporting the rim portion, a cover on said rim portion, a plurality of large headed tacks for ornamenting the rim portion and protecting said cover, a trough-shaped metal strip for retaining the cover on the edge of said rim portion, and a groove in said rim portion adapted to frictionally receive and retain a portion of said cover and the detachable center.

9. In a table top of the class described, the combination of separate rim and detachable center portions, said center portion being provided with a downturned vertical edge, a cover for said center portion stretched over the same and overlapping said vertical edges, and said rim portion having a vertical groove therein, said rim groove adapted to receive and frictionally engage said downturned edge and said cover.

In testimony whereof I have affixed my signature to this specification.

WARREN S. BELLOWS.